(12) United States Patent
Koezuka et al.

(10) Patent No.: US 9,760,746 B2
(45) Date of Patent: Sep. 12, 2017

(54) RFID READER/WRITER AND DIAGNOSIS PROCESSING PROGRAM

(71) Applicant: OMRON CORPORATION, Kyoto (JP)

(72) Inventors: Yahiro Koezuka, Kyoto (JP); Shuichi Matsui, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 74 days.

(21) Appl. No.: 14/561,583

(22) Filed: Dec. 5, 2014

(65) Prior Publication Data

US 2015/0227766 A1    Aug. 13, 2015

(30) Foreign Application Priority Data

Dec. 24, 2013 (JP) .................................. 2013-265334

(51) Int. Cl.
  *G06K 7/10* (2006.01)
  *G06K 7/01* (2006.01)
  *G06K 7/00* (2006.01)

(52) U.S. Cl.
  CPC .......... *G06K 7/10009* (2013.01); *G06K 7/01* (2013.01); *G06K 7/10118* (2013.01); *G06K 7/0008* (2013.01)

(58) Field of Classification Search
  CPC .... H04B 5/0056; H04B 5/0062; H04B 15/00; H04B 5/00; H04B 5/0081; H04W 4/008
  See application file for complete search history.

(56) References Cited

U.S. PATENT DOCUMENTS 7,369,036 B1   5/2008  Vacherand et al.
8,519,829 B2   8/2013  Koezuka et al.
(Continued)

FOREIGN PATENT DOCUMENTS

JP   2005-322029   11/2005
JP   2006-148670    6/2006
(Continued)

OTHER PUBLICATIONS

European Search Report issued in European Patent Application No. 14196124.3, dated Jun. 11, 2015.

*Primary Examiner* — Kabir A Timory
(74) *Attorney, Agent, or Firm* — Greenblum & Bernstein, P.L.C.

(57) ABSTRACT

One aspect of the present invention provides an RFID reader/writer and a diagnosis processing program for outputting correct diagnostic information on communication between the RFID reader/writer and an RF tag. The RFID reader/writer includes a communication unit configured to conduct communication with the RF tag and a communication diagnostic unit configured to diagnose the communication when the communication is successfully conducted. The communication diagnostic unit includes a characteristic acquisition unit configured to acquire a characteristic of the communication from a communication signal with the RF tag, a comparator configured to compare a value indicated by the acquired characteristic to a threshold used to determine a communication margin, and an output control unit configured to cause an output unit to output information on the communication margin from a comparison result.

9 Claims, 16 Drawing Sheets

(56) References Cited

U.S. PATENT DOCUMENTS

| | | | |
|---|---|---|---|
| 2005/0159913 A1 | 7/2005 | Ariyoshi et al. | |
| 2005/0170784 A1* | 8/2005 | Ariyoshi | G06K 7/0008 455/67.13 |
| 2005/0248439 A1 | 11/2005 | Sugiyama et al. | |
| 2008/0174410 A1* | 7/2008 | Sarangapani | G06K 7/0008 340/10.4 |
| 2010/0148931 A1 | 6/2010 | Pappu et al. | |
| 2012/0235799 A1 | 9/2012 | Yamasaki | |

FOREIGN PATENT DOCUMENTS

| | | |
|---|---|---|
| JP | 2010-79616 | 4/2010 |
| JP | 2011-138373 | 7/2011 |

\* cited by examiner

FIG. 18

| Notification item | Content |
|---|---|
| Insufficient transmission power | Indicating that transmission power from reader/writer to RF tag is insufficient. Facing directly reader/writer and RF tag to each other, shortening distance, and removing metallic substance when it exists around reader/writer and RF tag are conceivable as way of coping with problem. |
| Insufficient reception power | Indicating that response power from RF tag to reader/writer is insufficient. Facing directly reader/writer and RF tag to each other, shortening distance, and removing metallic substance when it exists around reader/writer and RF tag are conceivable as way of coping with problem. |
| Insufficient S/N ratio | Indicating that surrounding noise quantity is large to response power from RF tag to reader/writer. Facing directly reader/writer and RF tag to each other, shortening distance, removing metallic substance when it exists around reader/writer and RF tag, and reducing surrounding noise are conceivable as way of coping with problem. |
| Excessive noise | Indicating that noise around reader/writer is excessive. Reducing surrounding noise is conceivable as way of coping with problem. |

RFID READER/WRITER AND DIAGNOSIS PROCESSING PROGRAM

CROSS-REFERENCE TO RELATED APPLICATION

This application is based on Japanese Patent Application No. 2013-265334 filed with the Japan Patent Office on Dec. 24, 2013, the entire contents of which are incorporated herein by reference.

FIELD

The present invention relates to an RFID (Radio Frequency Identification) reader/writer and a diagnosis processing program, particularly to an RFID reader/writer having a diagnostic function regarding wireless communication with an RF (Radio Frequency) tag, and a diagnosis processing program.

BACKGROUND

Conventionally, various diagnostic functions concerning communication are proposed in a communication system including the RFID reader/writer and the RF tag. For example, Unexamined Japanese Patent Publication No. 2010-79616 discloses a reader/writer in which a "switch" is provided such that communication can be conducted with an inspecting RF tag chip incorporated in the reader/writer. The reader/writer can conduct communication with the inspecting RF tag chip to diagnose whether a reader/writer body is normal in advance of the communication with the RF tag.

In Unexamined Japanese Patent Publication No. 2006-148670, an RF tag chip has a function of measuring radio wave intensity transmitted from the reader/writer and sending back a measured radio wave intensity to the reader/writer. Therefore, it can be known how much power transmitted from the reader/writer reaches the RF tag.

In Unexamined Japanese Patent Publication No. 2005-322029, a CPU diagnoses whether a RF tag reader/writer device or a state of the wireless communication with the RF tag is abnormal. In Unexamined Japanese Patent Publication No. 2011-138373, operating power of a "reference tag" that is incorporated in or installed outside a reader/writer antenna is measured. Reader/writer transmission power is changed in a stepwise manner during the measurement, and reader/writer minimum output power at which a normal response is sent back from the reference tag is stored.

SUMMARY

For the configuration disclosed in Unexamined Japanese Patent Publication No. 2010-79616, whether the reader/writer body is normal is diagnosed and a user is notified of a diagnostic result, which allows whether "the reader/writer body or the communication with the RF tag is abnormal" to be distinguished from each other during the failed communication with the RF tag. However, in the case that the abnormal communication with the RF tag is generated, a cause of the abnormal communication is hardly investigated.

For the configuration disclosed in Unexamined Japanese Patent Publication No. 2006-148670, it is necessary to install the above special function in the RF tag chip, which increases production cost of the RF tag chip. In addition to how much power transmitted from the reader/writer reaches the RF tag, it is necessary to know a response power quantity from the RF tag to the reader/writer and a surrounding noise quantity as a parameter used to determine whether the RFID communication is successfully conducted. However, for the configuration disclosed in Unexamined Japanese Patent Publication No. 2010-79616, whether the RFID communication is successfully conducted can hardly be determined because of few parameters.

Whether the RFID communication is successfully conducted can hardly be determined for the configuration disclosed in Unexamined Japanese Patent Publication No. 2005-322029.

That is, whether the reader/writer body is normal is diagnosed and the user is notified of the diagnostic result, which allows whether "the reader/writer body or the communication with the RF tag is abnormal" to be distinguished from each other during the failed communication with the RF tag. However, in the case that the abnormal communication with the RF tag is generated, the cause of the abnormal communication is hardly investigated.

For the configuration disclosed in Unexamined Japanese Patent Publication No. 2011-138373, although the abnormal state of the reader/writer device can be diagnosed, an abnormal state, an abnormal content, and an abnormal cause can hardly be known during the communication with the RF tag. Therefore, it is difficult to know and cope with the cause of the communication abnormality generated in the site where the RFID reader/writer is used.

An object of the present invention is to provide an RFID reader/writer and a diagnosis processing program for outputting the correct diagnostic information on the communication between the RFID reader/writer and the RF tag.

According to one aspect of the present invention, an RFID reader/writer includes: a communication unit configured to conduct communication with an RF tag; and a communication diagnostic unit configured to diagnose the communication when the communication is successfully conducted. The communication diagnostic unit includes: a characteristic acquisition unit configured to acquire a characteristic of the communication from a communication signal with the RF tag; a determination unit configured to determine a communication margin from a value of the characteristic based on a predetermined criterion; and an output control unit configured to cause an output unit to output information on the communication margin from a determination result.

Preferably the determination unit includes a comparison unit configured to compare the value of the characteristic to a predetermined threshold, and the output control unit causes the output unit to output the information on the communication margin from a comparison result.

Preferably the characteristic includes a noise quantity generated around the RFID reader/writer, and the characteristic acquisition unit includes: a noise acquisition unit configured to acquire the noise quantity generated around the RFID reader/writer; and a reception power measuring unit configured to acquire reception power from a reception signal.

Preferably the characteristic includes an S/N ratio of the reception signal, and the characteristic acquisition unit includes an S/N ratio acquisition unit configured to calculate the S/N ratio from the reception power of the reception signal and the noise quantity.

Preferably the characteristic includes reception power, and the characteristic acquisition unit includes a reception power acquisition unit configured to acquire the reception power from the reception signal.

Preferably the characteristic expresses reception of a response signal when a predetermined level of transmission power is indicated, the predetermined criterion indicates whether the reception is successfully performed, and the determination unit determines the communication margin based on whether the response signal is successfully received when the predetermined level of transmission power is indicated.

Preferably the predetermined level of transmission power indicates weak transmission power at which it is determined that the RFID reader/writer is configured to conduct stable communication.

Preferably the predetermined level of transmission power includes a level that corresponds to each segment when a range from weak transmission power to maximum power at which it is determined that the RFID reader/writer is configured to conduct stable communication is divided into a plurality of segments.

Preferably information output to the output unit includes a notification based on the characteristic and a coping item of increasing the communication margin.

Preferably the RFID reader/writer further includes a unit configured to enable or disable the diagnostic function of the communication diagnostic unit.

According to another aspect of the present invention, a diagnosis processing program that is executed by a computer to perform diagnostic processing of communication with an RF tag, the diagnosis processing program causes the computer to act as: a characteristic acquisition unit configured to acquire a characteristic of the communication from a communication signal with the RF tag when the communication is successfully conducted; a unit configured to determine a communication margin from a value of the characteristic based on a predetermined criterion; and an output control unit configured to cause an output unit to output information on the communication margin from a determination result.

Accordingly, in the present invention, the RFID reader/writer diagnoses the communication with the RFID tag, outputs the information on the communication margin from the diagnostic content, and outputs the correct diagnostic information on the communication.

BRIEF DESCRIPTION OF THE DRAWINGS

FIG. 18 is a view illustrating a table MT of the embodiment.

DETAILED DESCRIPTION

Figure 1:
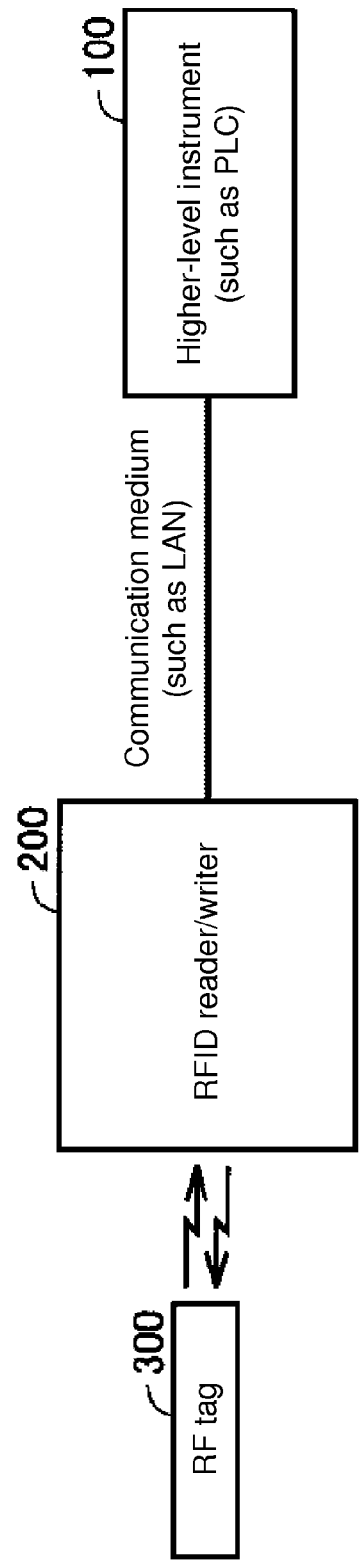
FIG. 1 is a configuration diagram of a system according to an embodiment of the present invention.

Hereinafter, an exemplary embodiment of the present invention will be described in detail with reference to the drawings. In the drawings, the identical or equivalent component is designated by the identical numeral, and the overlapping description is neglected.

Embodiment (System Configuration)

FIG. 1 is a configuration diagram of a system according to an embodiment of the present invention. The system includes a higher-level instrument 100 such as a PLC (Programmable logic controller) equivalent to a computer, an RFID reader/writer 200, and an RF tag 300 provided with a memory. The higher-level instrument 100 conducts communication with the RFID reader/writer 200 by a (wired or wireless) communication medium such as a LAN (Local Area Network), and the RF tag 300 conducts wireless communication with the RFID reader/writer 200.

In the embodiment, the communication of the RFID reader/writer 200 includes communication with the RF tag 300. In the communication, the RFID reader/writer 200 and the RF tag 300 transmit and receive a command such as a query and a response (data) to and from each other in order to read and write information in the memory of the RF tag 300.

For example, the system in FIG. 1 is installed in a cargo management site and an assembly line of a factory. The RF tag 300 is attached to an article carried on a line, and provided with a storage medium in which various pieces of information are written. The RFID reader/writer 200 writes and reads the information in and from the storage medium by wireless communication with the RF tag 300 in a contactless manner, and transmits the information on the communication with the RF tag 300 to the higher-level instrument 100. The higher-level instrument 100 processes the information received from the RFID reader/writer 200. A user can confirm a write or read result of the RF tag 300 from the RFID reader/writer 200 or the higher-level instrument 100.

Because generally the RF tag 300 and RFID reader/writer 200 of the system in FIG. 1 is introduced in an environment in which various devices are installed, various noises are mixed in a communication range of the wireless communication between the RF tag 300 and the RFID reader/writer 200 and there is a risk of generating a communication error. Therefore, a communication diagnostic function of diagnosing a communication state is provided in the system of FIG. 1.

(Configuration of Higher-Level Instrument 100)

Figure 2:
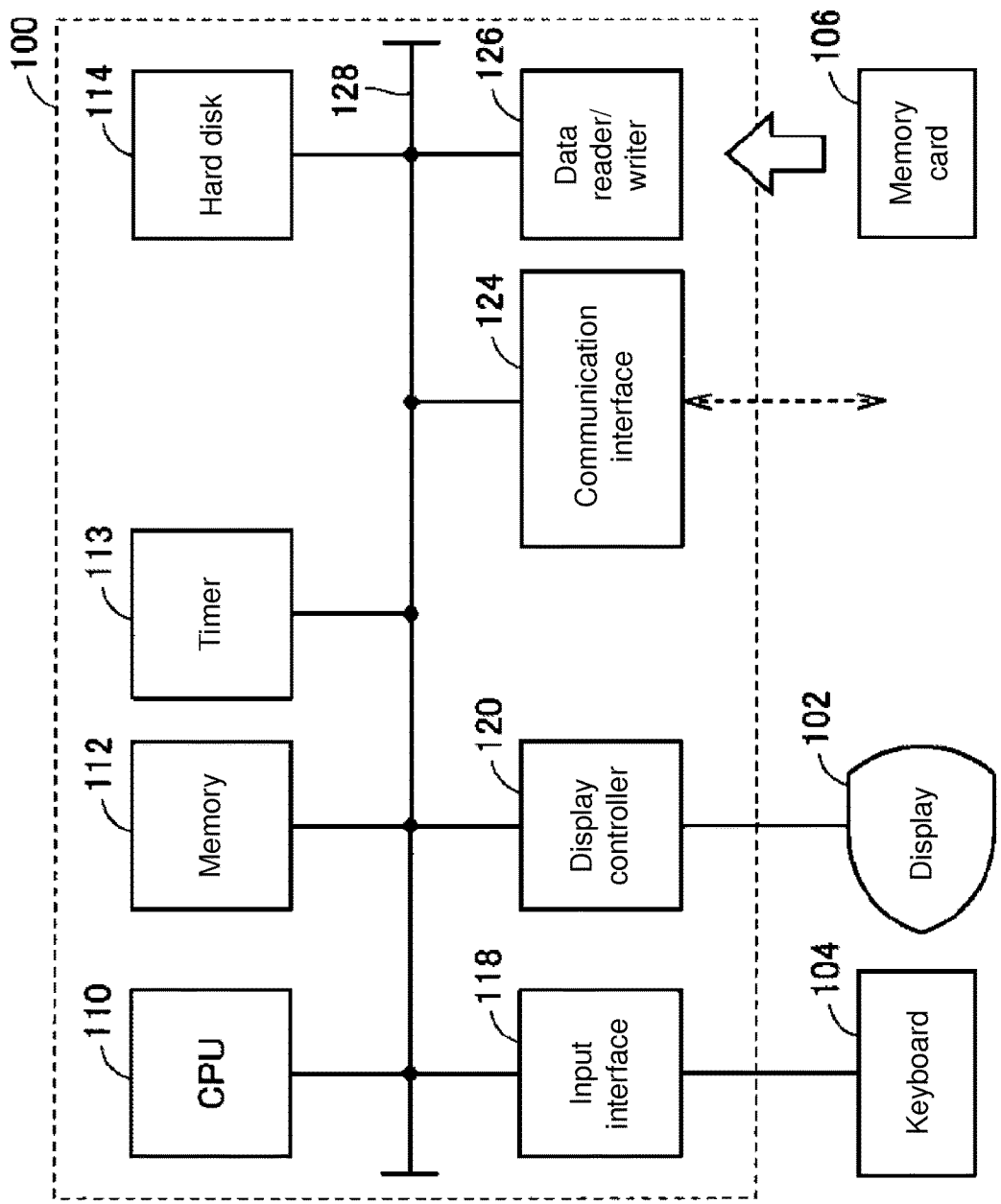
FIG. 2 is a schematic configuration diagram of a higher-level instrument 100 of the embodiment.

FIG. 2 is a schematic configuration diagram of the higher-level instrument 100 of the embodiment. Referring to FIG. 2, the higher-level instrument 100 includes a CPU (Central Processing Unit) 110 that is of a calculation processor, a memory 112 and a hard disk 114 that are of a storage, a timer 113 that measures time to output timing data to the CPU 110, an input interface 118, a display controller 120, a communication interface 124, and a data reader/writer 126. These units are connected to one another through a bus 128 while being able to conduct data communication with one another.

The CPU 110 executes a program (code) stored in the hard disk 114, thereby performing various calculations. Typically the memory 112 is a volatile storage device such as a DRAM (Dynamic Random Access Memory). In addition to program data read from the hard disk 114, data received from the RFID reader/writer 200 and work data are stored in the memory 112.

The input interface 118 mediates data transmission between the CPU 110 and an input device such as a keyboard 104, a mouse (not illustrated) 103, and a touch panel (not illustrated). That is, the input interface 118 receives a manipulation command that is issued in such a manner that the user manipulates the input device.

The display controller 120 is connected to a display 102 that is of a typical example of a display device. The display controller 120 notifies the user of a processing result of the CPU 110 by displaying the processing result.

The communication interface 124 mediates the data transmission between the CPU 110 and the RFID reader/writer 200 through the LAN. The data reader/writer 126 mediates the data transmission between the CPU 110 and a memory card 106 that is of a recording medium.

Another output device such as a printer may be connected to the higher-level instrument 100 as needed basis.

(Configurations of RFID Reader/Writer 200 and RF Tag 300)

Figure 3:
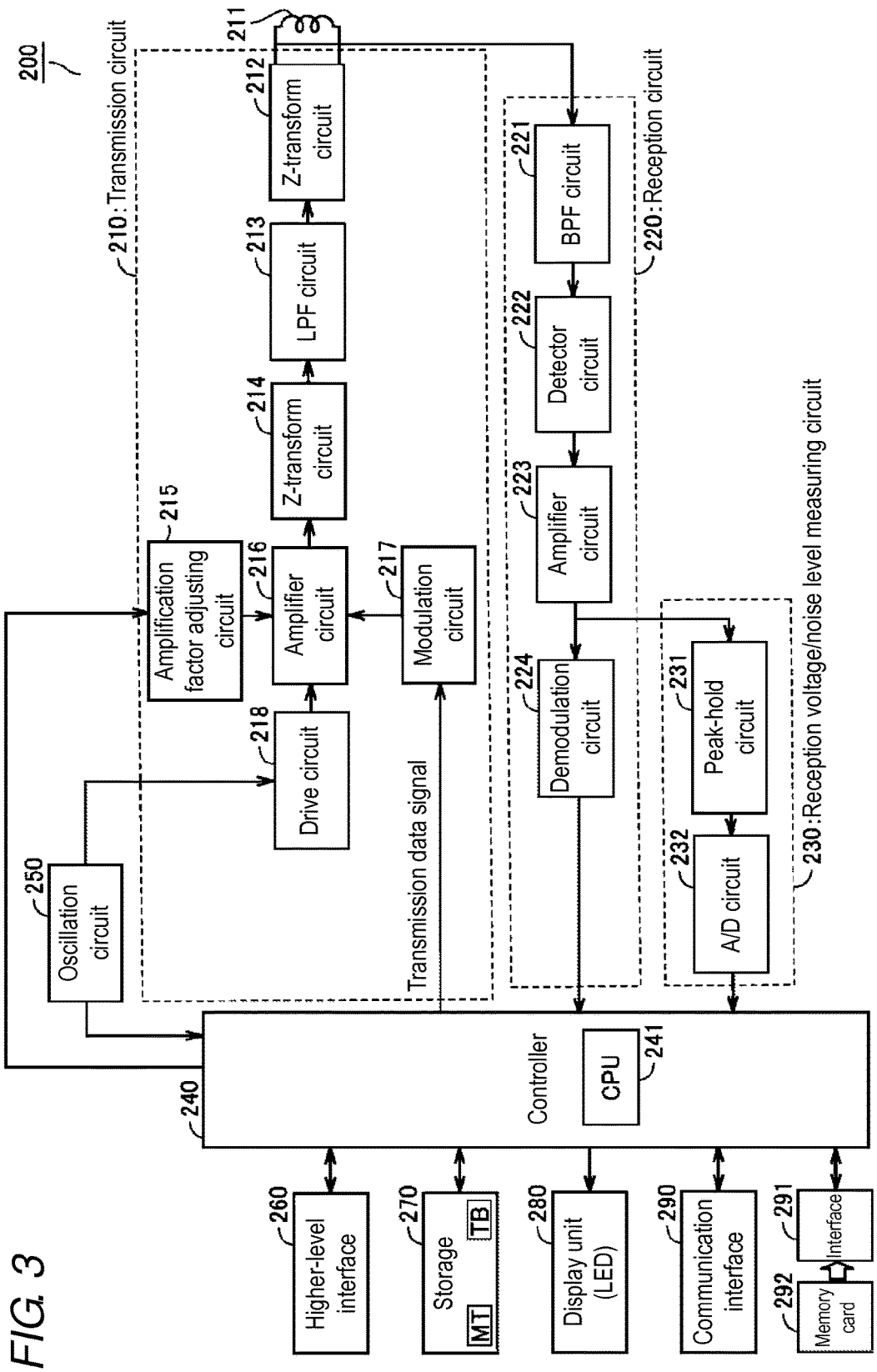
FIG. 3 is a configuration diagram of an RFID reader/writer 200 of the embodiment.
Figure 4:
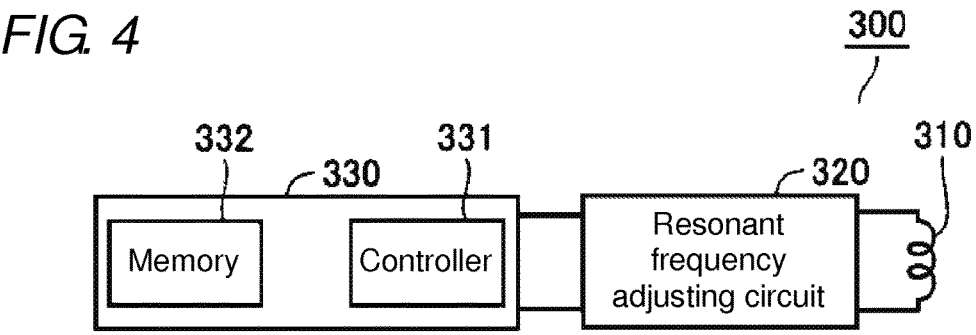
FIG. 4 is a configuration diagram of an RF tag 300 of the embodiment.

FIG. 3 is a configuration diagram of the RFID reader/writer 200 of the embodiment. FIG. 4 is a configuration diagram of the RF tag 300 of the embodiment. Configurations of the RFID reader/writer 200 and the RF tag 300 that is of a communication target of the RFID reader/writer 200 will be described with reference to FIGS. 3 and 4. In the embodiment, the RF tag 300 in FIG. 4 is what is called a passive type RF tag that is not provided with a power supply but operated by an induced electromotive force generated by a transmission wave from the RFID reader/writer 200. The RF tag 300 includes a tag IC circuit 330 and a communication unit, and the tag IC circuit 330 includes a controller 331 and a semiconductor memory 332. The communication unit includes an antenna coil 310 and a resonant frequency adjusting circuit 320 (such as a capacitor). The controller 331 includes a modem circuit that modulates or demodulates a communication signal with the RFID reader/writer 200 in addition to a computer. The RF tag 300 is not limited to the passive type, but may be a type provided with the power supply.

Referring to FIG. 3, the RFID reader/writer 200 includes a communication unit that conducts communication with the RF tag 300, a reception voltage/noise level measuring circuit 230, a controller 240 that includes a CPU (Central Processing Unit) 241, a higher-level interface 260 that is of a communication module conducting communication with the higher-level instrument 100, a storage 270 that is of a volatile or nonvolatile storage medium such as a ROM (Read Only Memory) and a RAM (Random Access Memory), a display unit 280 that includes a numerical indicator and plural indicating lamps (LEDs: Light Emitting Diodes), a communication interface 290 that conducts communication with an external network, and an interface 291.

The communication unit includes an antenna coil 211, a transmission circuit 210, a reception circuit 220, and an oscillation circuit 250.

The interface 291 mediates the data transmission between the CPU 241 and a memory card 292 that is of the recording medium. The memory card 292 is distributed while a program executed by the RFID reader/writer 200 is stored therein, and the interface 291 reads the program from the memory card 292. In response to an internal command of the CPU 241, the interface 291 writes a processing result of the communication with the higher-level instrument 100 or the RF tag 300 in the memory card 292. The memory card 292 includes general-purpose semiconductor storage devices such as CF (Compact Flash) and SD (Secure Digital), magnetic storage mediums such as FD (Flexible Disk), and optical storage mediums such as CD-ROM (Compact Disk Read Only Memory).

The controller 240 has a function corresponding to a computer. Specifically, based on the program stored in the memory such as the storage 270, the CPU 241 performs processing of the communication with the higher-level instrument 100, processing of the communication with the RF tag 300, and various pieces of data processing including later-described communication diagnostic processing. The controller 240 outputs a pulse signal from which a carrier based on a pulse signal from the oscillation circuit 250 with respect to the processing of the communication with the RF tag 300. The controller 240 also outputs a pulse signal (hereinafter, the output signal is also referred to as a "command signal") expressing a command during the communication with the RF tag 300.

The storage 270 stores the program and data for the purpose of various pieces of data processing. The data includes a table TB that is referred to (searched) by the CPU 241 in the case that communication diagnostic processing is performed and a table MT that is referred to (searched) for the purpose of a notification (output) of a diagnostic result.

The transmission circuit 210 includes a drive circuit 218, a modulation circuit 217, an amplifier circuit 216 that has a variable amplification factor, Z-transform circuits 212 and 214, an LPF (Low-Pass Filter) circuit 213, and an amplification factor adjusting circuit 215 that changes the amplification factor.

The reception circuit 220 includes a BPF (Band-Pass Filter) circuit 221, a detector circuit 222, an amplifier circuit 223, and a demodulation circuit 224.

The reception voltage/noise level measuring circuit 230 includes a peak-hold circuit 231 that extracts a level of reception signal of the reception circuit 220 as digital data and an A/D (Analog/Digital conversion) circuit 232.

(Communication Operation)

In a communication operation between the RFID reader/writer 200 and RF tag 300 in FIGS. 3 and 4, in the case that information is read from and written in the RF tag 300, the RFID reader/writer 200 transmits the command received from the higher-level instrument 100 to the RF tag 300, and the RFID reader/writer 200 transmits a received response content to the higher-level instrument 100 when receiving a response to the command from the RF tag 300. During the communication, because the RF tag 300 does not include an internal power supply, the induced electromotive force is generated in the antenna coil 310 on the side of the RF tag 300 by the transmission wave from the antenna coil 211, thereby driving the controller 331 in the RF tag 300. During the communication, the controller 240 of the RFID reader/writer 200 properly outputs the command signal having the predetermined number of bits while oscillating a 13.56-MHz carrier signal based on the output signal of the oscillation circuit 250. The carrier signal is amplified by the amplifier circuit 216 after converted into the carrier by the drive circuit 218. Then, the carrier signal is supplied to the antenna coil 211 through impedance matching processing performed by the Z-transform circuits 214 and 212 and filter processing performed by the LPF circuit 213, and transmitted as an electromagnetic wave from the antenna coil 211. The modulation circuit 217 performs amplitude modulation of the carrier based on the command signal, whereby the command signal is superimposed on the carrier. A communication frequency is not limited to 13.56 MHz.

When the carrier is transmitted from the antenna coil 211 by the above operation, the carrier generates the induced electromotive force in the RF tag 300 located in a communication range, and the controller 331 on the side of the RF tag 300 is started. At this point, when the carrier on which the command signal is superimposed is transmitted from the antenna coil 211, the controller 331 of the RF tag 300 decodes the command expressed by the command signal, performs processing instructed by the command, generates the response (response signal) expressing response data, and sends back the response to the RFID reader/writer 200.

The reception circuit 220 of the RFID reader/writer 200 receives the response from the RF tag 300. After the BPF circuit 221 removes the noise from the reception signal, the detector circuit 222 extracts the response signal. After amplified by the amplifier circuit 223, the extracted response signal is converted into the digital data by the demodulation circuit 224 and output to the controller 240. The CPU 241 decodes the response content of the RF tag 300 from the digital data output from the demodulation circuit 224, and outputs communication result data including the decoded data. For example, the CPU 241 transmits the communication result data to the higher-level instrument 100, stores the communication result data in the storage 270, displays the communication result data on the display unit 280, or lights the LED.

The reception signal output from the amplifier circuit 223 is output to the reception voltage/noise level measuring circuit 230. In the reception voltage/noise level measuring circuit 230, the peak-hold circuit 231 performs detection processing of the received response signal. Specifically, the peak-hold circuit 231 generates a signal (envelope signal) expressing a change in voltage level that is of a peak value of each amplitude of the response signal. The A/D circuit 232 converts the envelope signal from the peak-hold circuit 231 into the digital data, and outputs the digital data to the controller 240.

In the embodiment, because of the use of the passive tag in which the RF tag 300 is not provided with the power supply, the communication system between the RFID reader/writer 200 and the RF tag 300 is a half-duplex system, the antenna is shared by the transmission antenna and the reception antenna, and the transmission signal and the reception signal are separated from each other.

(Functional Configuration)

Figure 5:
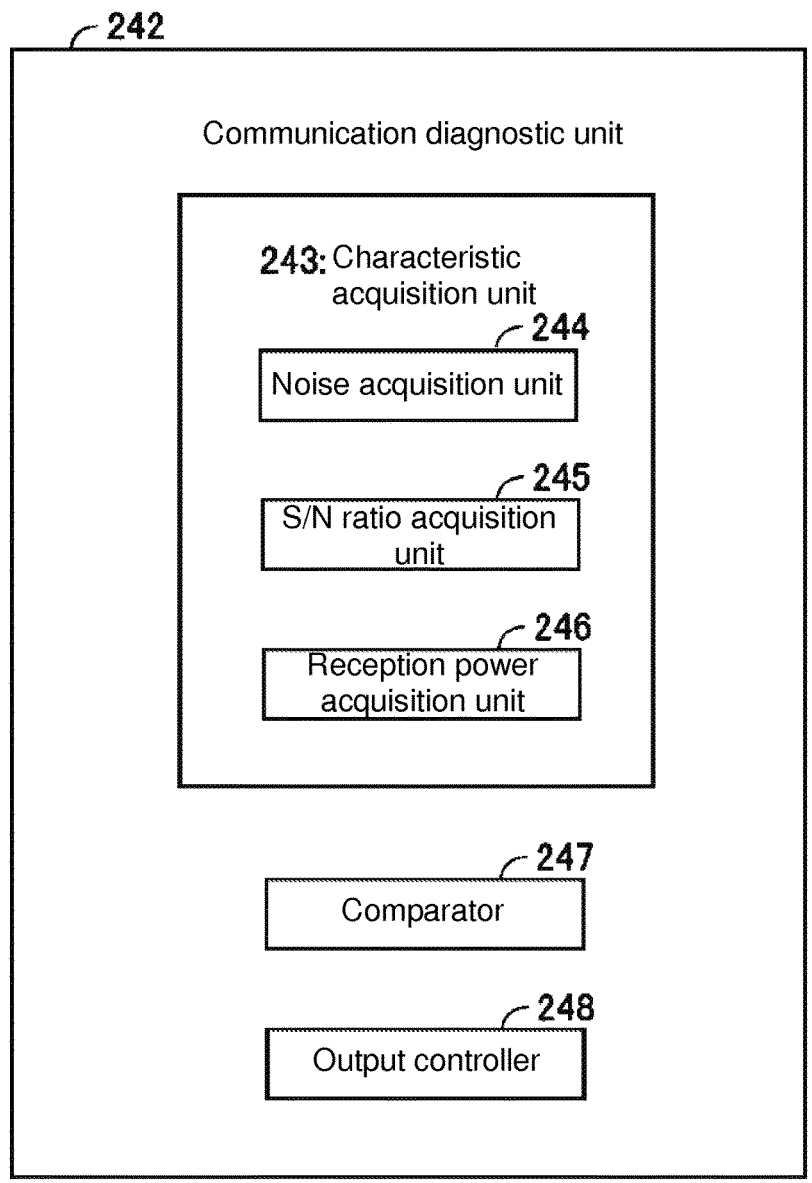
FIG. 5 is a functional configuration diagram of the RFID reader/writer 200 of the embodiment.

FIG. 5 is a functional configuration diagram of the RFID reader/writer 200 of the embodiment. Referring to FIG. 5, the RFID reader/writer 200 includes a communication diagnostic unit 242 that diagnoses the communication in the case that the communication unit successfully conducts communication with the RF tag 300. The communication diagnostic unit 242 includes a characteristic acquisition unit 243 that acquires a characteristic of the communication with the RF tag 300, a comparator 247 that compares a value indicated by the acquired characteristic to a threshold ensuring the stable communication operation, and an output controller 248 that causes an output unit to output a communication margin indicating how much the value is greater than (or less than) the threshold from a comparison result. The communication margin indicates information on whether the stable communication operation can be performed.

The characteristic acquisition unit 243 includes a noise acquisition unit 244 that transmits only the carrier to acquire a noise quantity around the RFID reader/writer 200, an S/N ratio acquisition unit 245 that acquires an S/N ratio by calculating the S/N ratio from the power of the reception signal and the noise quantity, and a reception power acquisition unit 246 that acquires reception power from the output of the reception voltage/noise level measuring circuit 230.

Each unit in FIG. 5 is implemented by the program executed by the CPU 241 or a combination of the program and the circuit.

(Communication Diagnostic Processing)

The communication diagnostic processing performed by the communication diagnostic unit 242 will be described below. The embodiment has the following diagnostic functions based on the noise quantity, S/N ratio, reception power, and transmission power, which are of characteristic values of the communication. These characteristic values are parameters having an influence on communication performance. However, kinds of the characteristic values used in the diagnosis are not limited to the above characteristic values.

<Noise Diagnosis>

It is determined how much noise (radio waves oscillated by a switching power supply, a motor, an inverter, and other RFID reader/writers) quantities generated in the RFID reader/writer 200, the RF tag 300, and a surrounding of the RF tag 300 exist with respect to a predetermined threshold.

<S/N Ratio Diagnosis>

It is determined how much noise quantity to a radio wave (power) quantity sent back to the RFID reader/writer 200 by the RF tag 300 exists with respect to a predetermined threshold.

<Reception Power Diagnosis>

Based on a predetermined threshold, it is determined how much radio wave (power) sent back to the RFID reader/writer 200 by the RF tag 300 reaches the RFID reader/writer 200.

<Transmission Power Diagnosis>

It is determined how much radio wave (power) transmitted from the RFID reader/writer 200 reaches the RF tag 300.

(Schematic Processing Flow)

Figure 6:
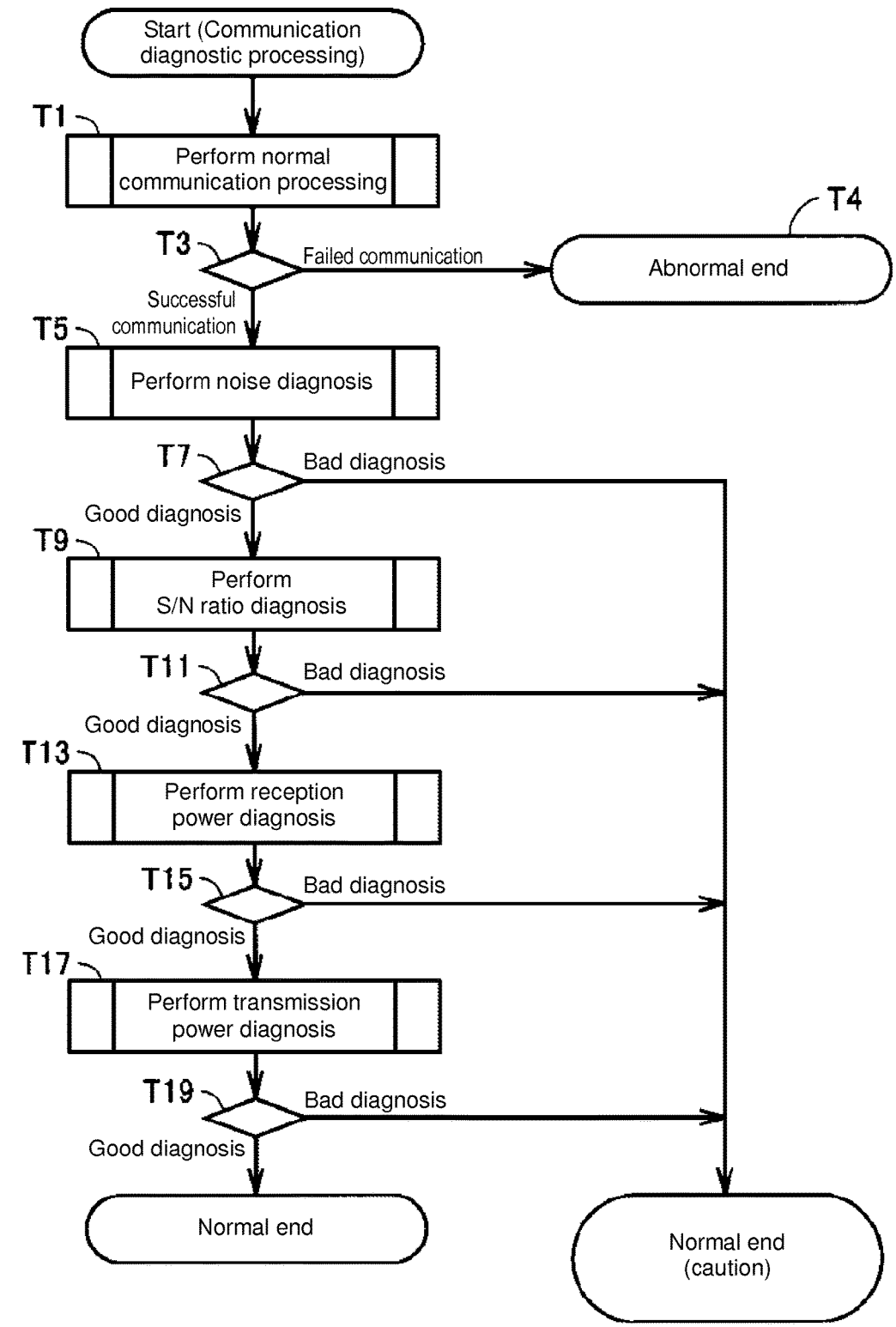
FIG. 6 is a flowchart of communication diagnostic processing of the embodiment.

FIG. 6 is a flowchart of communication diagnostic processing of the embodiment. At this point, it is assumed that the RF tag 300 is located within a distance where the RF tag 300 can conduct normal communication with the RFID reader/writer 200. Referring to FIG. 6, the RFID reader/writer 200 transmits the command to the RF tag 300 to perform normal communication processing of receiving the response signal from the RF tag 300 (Step T1).

The controller 240 (more specifically, the CPU 241) of the RFID reader/writer 200 determines whether the communication is successfully conducted through the normal communication processing based on the received response signal (Step T3). For example, data incompleteness (data error) is detected from a value of CRC (Cyclic Redundancy Check) that is of an error detection code included in data obtained by the A/D conversion of the response signal.

When the "failed communication" is determined based on a detection result ("failed communication" in Step T3), "abnormal end" is output (Step T4). On the other hand, when the "successful communication" is determined based on the detection result ("successful communication" in Step T3), the communication diagnostic unit performs the following diagnostic processing. The determination of the successful/failed communication is not limited to the method in which the CRC is used, but the determination may be made based on time-out during which the response signal cannot be received or an error response.

In the diagnostic processing, the controller 240 performs noise diagnostic processing (Step T5) based on the noise quantity acquired by the noise acquisition unit 244 through the normal communication processing. When the "bad diagnosis" is determined as a diagnostic result ("bad diagnosis" in Step T7), "normal end (caution)" is output. When the "good diagnosis" is determined ("good diagnosis" in Step T7), the controller 240 performs S/N ratio diagnostic processing from the S/N ratio acquired by the S/N ratio acquisition unit 245 (Step T9). When the "bad diagnosis" is determined as the diagnostic result ("bad diagnosis" in Step T11), the "normal end (caution)" is output. When the "good diagnosis" is determined ("good diagnosis" in Step T11), the controller 240 performs reception power diagnostic processing from the reception power acquired by the reception power acquisition unit 246 (Step T13). When the "bad diagnosis" is determined as the diagnostic result ("bad diagnosis" in Step T15), the "normal end (caution)" is output. When the "good diagnosis" is determined ("good diagnosis" in Step T15), the controller 240 performs transmission power diagnostic processing from the transmission power acquired by the transmission power acquisition unit (Step T17). When the "bad diagnosis" is determined as the diagnostic result ("bad diagnosis" in Step T19), the "normal end (caution)" is output. When the "good diagnosis" is determined ("good diagnosis" in Step T19), the "normal end" is output.

The diagnostic result (the normal end (caution) and the normal end) indicates the communication margin. At this point, the normal end (caution) expresses that the communication margin is lower than that of the normal end. The output controller 248 transmits the output to the higher-level instrument 100, stores the output in the storage 270, or displays the output on the display unit 280 (lights the LED). For the LED, for example, the abnormal end is indicated by lighting/blinking in "red", the normal end (caution) is indicated by lighting/blinking in "yellow", and the normal end is indicated by lighting/blinking in "green". Accordingly, the user can check the diagnosed communication margin by the display 102 of the higher-level instrument 100, the display unit 20, the lighting of the LED, or the data read from the storage 270.

(Normal Communication Processing)

Figure 7:
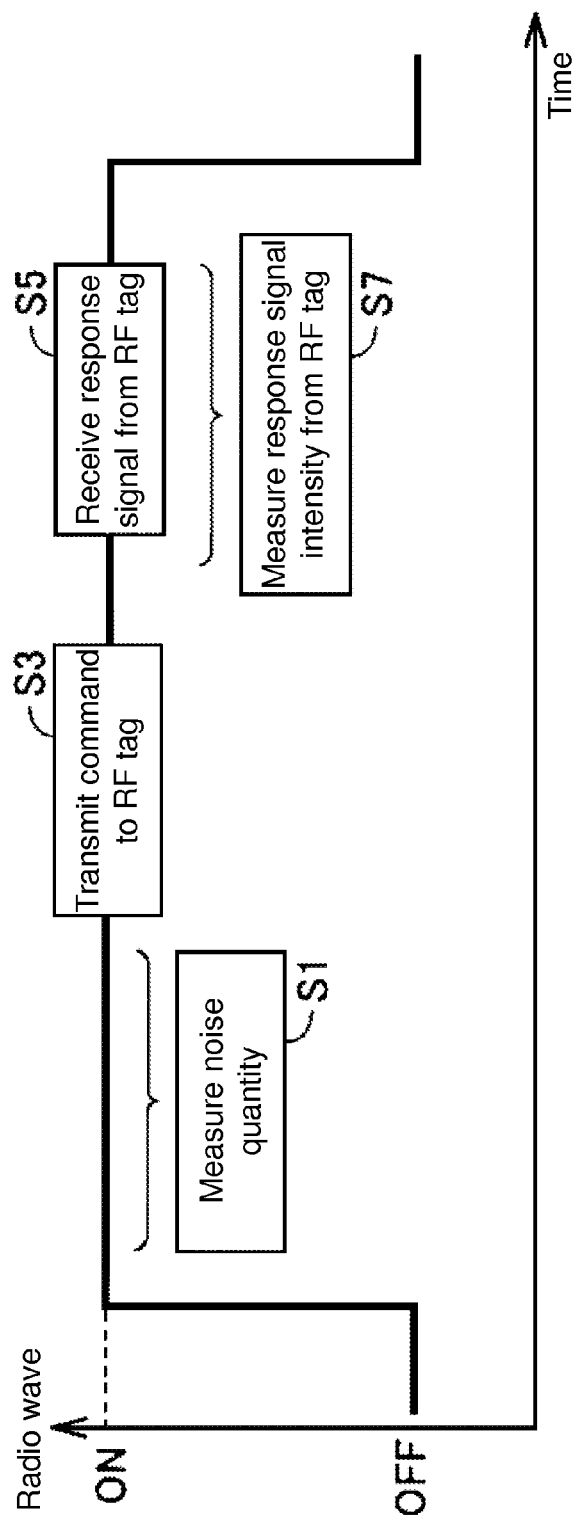
FIG. 7 is a view illustrating normal communication processing (Step T1) of the embodiment.

FIG. 7 is a view illustrating the normal communication processing (Step T1) of the embodiment. In FIG. 7, a vertical axis indicates a radio wave level of the transmission signal in the case that the oscillation is performed at a predetermined maximum power, and a horizontal axis indicates elapsed time. Referring to FIG. 7, the controller 240 controls the oscillation circuit 250, and measures the noise quantity when only the carrier signal on which the transmission data signal such as the command is not superimposed is transmitted from the transmission circuit 210 (Step S1).

Specifically, the noise acquisition unit 244 measures the noise quantity (voltage) from the level of signal extracted from the reception signal by the reception voltage/noise level measuring circuit 230. At this point, the carrier is always output, and the change in level of reception signal reflects the surrounding noise in the case that the communication with the RF tag 300 is not conducted. The reception voltage/noise level measuring circuit 230 performs a peak-hold operation such that a level is extracted when the reception signal shifts higher, thereby detecting a level (also referred to as a "noise level") reflecting magnitude of the noise. Processing of sampling the detected noise level is performed plural times to calculate an average value of the sampled values, and the average value is stored in the storage 270. The calculated average value indicates the noise quantity.

When the noise quantity is measured in advance of the communication with the RF tag 300, the controller 240 controls the transmission circuit 210 such that the command signal is transmitted to the RF tag 300 (Step S3).

The controller 240 receives the response signal to the command signal from the RF tag 300 (Step S5), and the reception power acquisition unit 246 measures the reception power (Step S7). Specifically, the reception power is measured using a voltage value indicated by the signal input from the reception voltage/noise level measuring circuit 230. The average value of peak voltages of large amplitude portions of the reception signal generated by the change in impedance on the side of the RF tag 300 is calculated and stored in the storage 270. At this point, the calculated voltage average value indicates the reception power. The normal communication processing is ended when the reception power is measured.

(Noise Diagnostic Processing)

Figure 8:
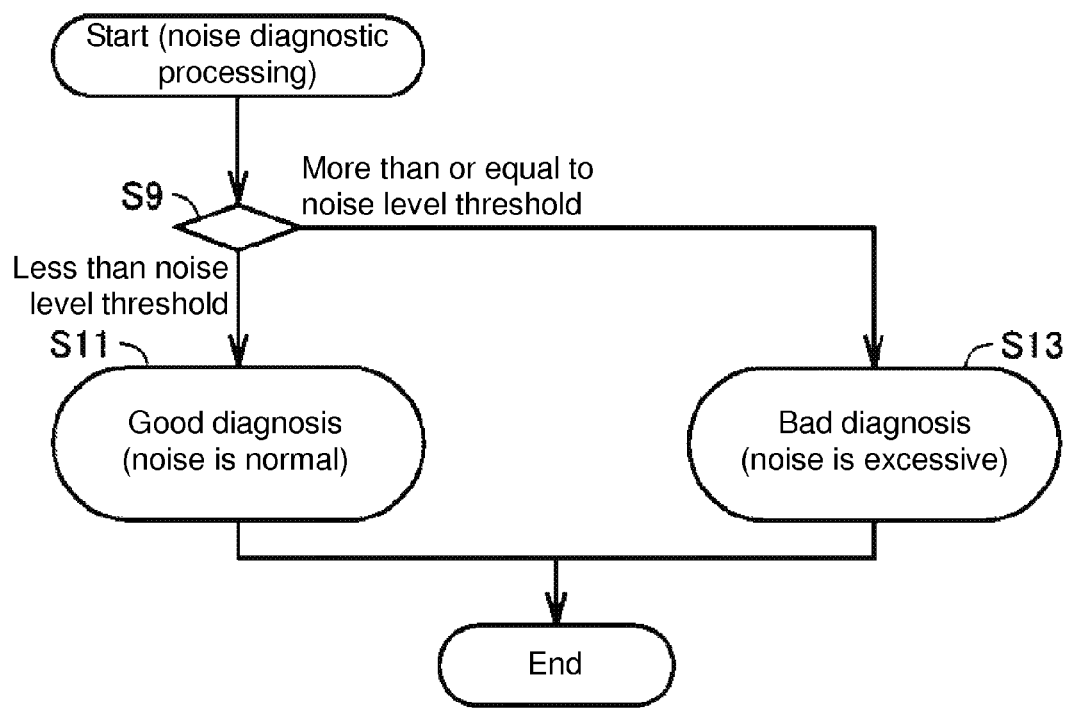
FIG. 8 is a flowchart of noise diagnostic processing of the embodiment.

FIG. 8 is a flowchart of the noise diagnostic processing of the embodiment. When the noise diagnostic processing is started, the communication diagnostic unit 242 compares the measured noise quantity to a predetermined threshold, and determines whether a condition of (measured noise quantity≥threshold) holds (Step S9). When determining that the measured noise quantity is less than the threshold from the conditional expression ("less than noise level threshold" in Step S9), the communication diagnostic unit 242 outputs the "good diagnosis (noise is normal)" (Step S11). When determining that the measured noise quantity is greater than or equal to the threshold from the conditional expression ("greater than or equal to noise level threshold" in Step S9), the communication diagnostic unit 242 outputs the "bad diagnosis (noise is excessive)" (Step S13).

Figure 9:
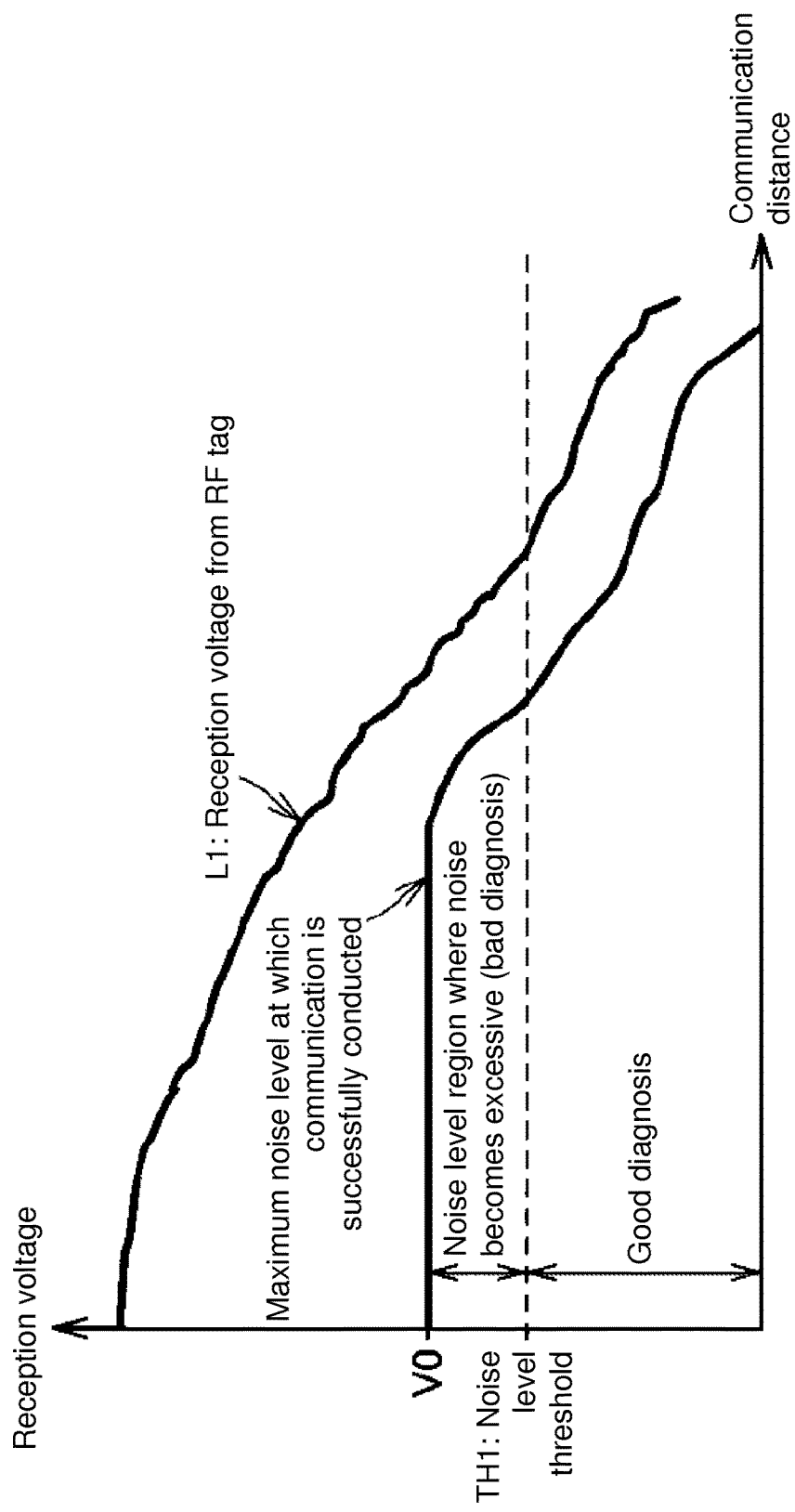
FIG. 9 is a graph illustrating the noise diagnostic processing of the embodiment.

FIG. 9 is a graph illustrating the noise diagnostic processing of the embodiment. The graph in FIG. 9 is acquired from an experiment. The vertical axis indicates the reception signal (reception voltage: unit of V), and the horizontal axis indicates a communication distance that is of the distance between the RFID reader/writer 200 and the RF tag 300.

As illustrated in FIG. 9, a reception voltage L1 indicated by the reception signal from the RF tag 300 is lowered with increasing communication distance. In the embodiment, a noise level threshold TH1 having a predetermined margin from the value V0 is set in the case that a maximum noise level value V0 at which the communication is determined to be successful in Step T3 is set. Accordingly, when determining that the reception voltage falls within a range from the threshold TH1 to the maximum noise level V0 ("greater than or equal to noise level threshold" in Step S9), the communication diagnostic unit 242 outputs the "bad diagnosis (noise is excessive)". When determining that the reception voltage is less than the threshold TH1, the communication diagnostic unit 242 outputs the "good diagnosis".

In the case that the "good diagnosis" is output, it is said that the communication margin is high with respect to the surrounding noise quantity. In the case that the "bad diagnosis (noise is excessive)" is output due to the noisy usage environment, it is said that the communication margin is low although the communication is successful.

(S/N Ratio Diagnostic Processing)

Figure 10:
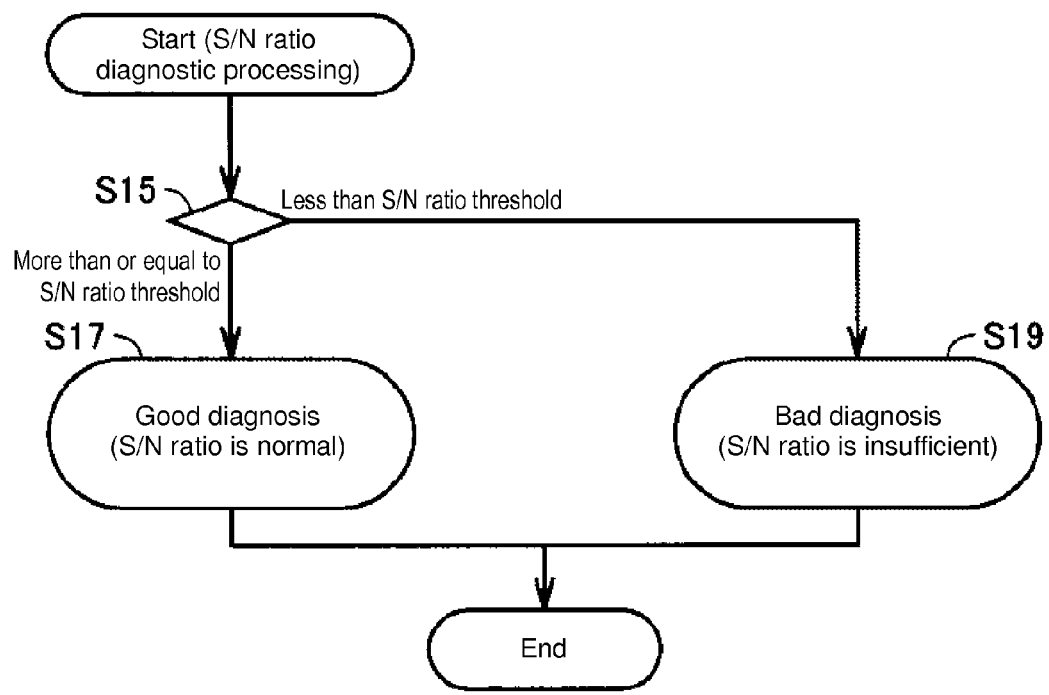
FIG. 10 is a flowchart of S/N (Signal-to-Noise) ratio diagnostic processing of the embodiment.

FIG. 10 is a flowchart of the S/N (Signal-to-Noise) ratio diagnostic processing of the embodiment. At this point, "S" indicates the reception signal (reception voltage) measured in Step S7, and "N" indicates the surrounding noise quantity (voltage) measured in Step S1.

When the S/N ratio diagnostic processing is started, the S/N ratio acquisition unit 245 calculates the S/N ratio based on the measured value. The communication diagnostic unit 242 compares the calculated S/N ratio to the predetermined threshold to determine whether a condition of (S/N ratio ≥threshold) holds (Step S15). When determining that the condition holds ("greater than or equal to S/N ratio threshold" in Step S15), the communication diagnostic unit 242 outputs the "good diagnosis (S/N ratio is normal)" (Step S17). On the other hand, when determining that the condition does not hold ("less than S/N ratio threshold" in Step S15), the communication diagnostic unit 242 outputs the "bad diagnosis (S/N ratio is insufficient)" (Step S19).

Figure 11:
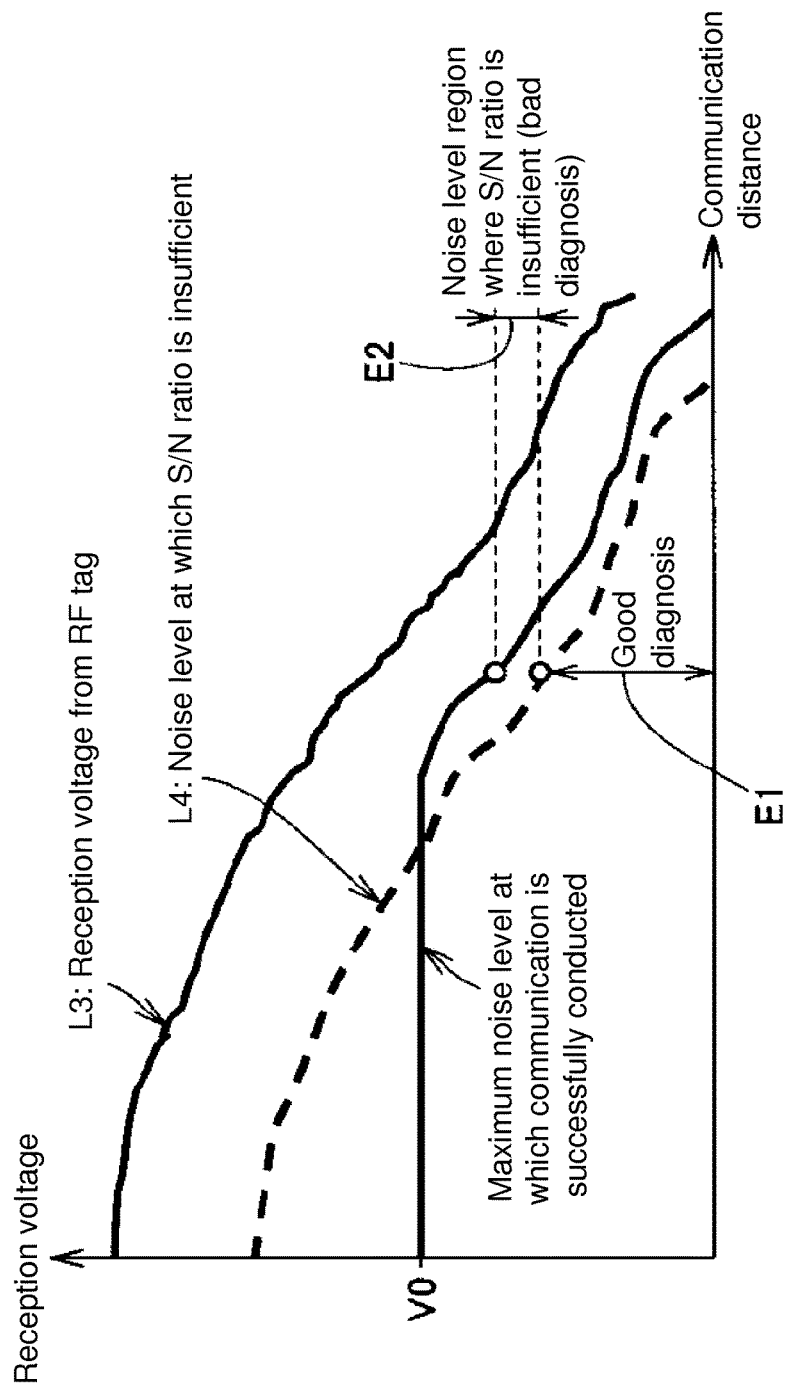
FIG. 11 is a graph illustrating the S/N ratio diagnostic processing of the embodiment.

FIG. 11 is a graph illustrating the S/N ratio diagnostic processing of the embodiment. The graph in FIG. 11 is acquired from an experiment. The vertical axis indicates the voltage of the reception signal from the RF tag 300, and the horizontal axis indicates the communication distance. FIG. 11 illustrates a graph L3 of the reception voltage indicated by the reception signal from the RF tag 300 and a graph L4 indicating the change in noise level at which the S/N ratio becomes insufficient. In FIG. 11, a region E2 calculated from the noise quantity indicating a predetermined margin from the maximum noise level value V0 is used as the threshold in Step S15. Accordingly, the "good diagnosis (S/N ratio is normal)" is output in Step S19 in the case that the S/N ratio corresponding to a region E1 indicating the S/N ratio less than the region E2 is measured, and the "bad diagnosis (S/N ratio is insufficient)" is output in the case that the S/N ratio corresponding to the region E2 is measured.

In the case that the "good diagnosis" is output, it is said that the communication margin is high with respect to the S/N ratio. In the case that the "bad diagnosis (S/N ratio is insufficient)" is output due to the noisy usage environment, it is said that the communication margin is low although the communication is successful.

(Reception Power Diagnostic Processing)

Figure 12:
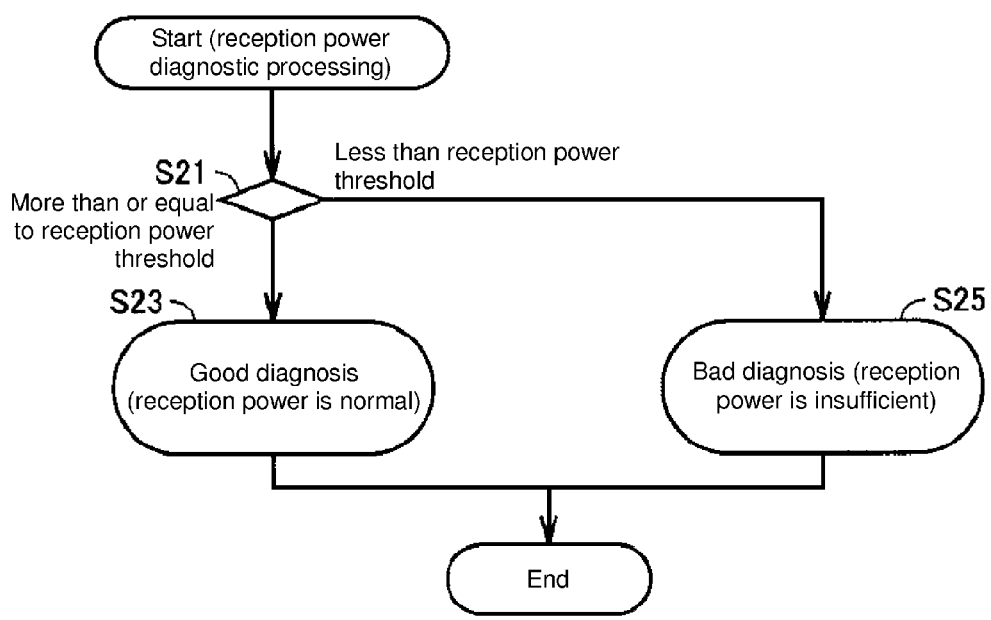
FIG. 12 is a flowchart of reception power diagnostic processing of the embodiment.

FIG. 12 is a flowchart of the reception power diagnostic processing of the embodiment. When the reception power diagnostic processing is started, the communication diagnostic unit 242 compares the reception power acquired during the reception in Step S5 to a predetermined threshold, and determines whether a condition of (reception power threshold) holds (Step S21). When determining that the reception power is greater than or equal to the threshold from the conditional expression ("greater than or equal to reception power threshold" in Step S21), the communication diagnostic unit 242 outputs the "good diagnosis (reception power is normal)" (Step S23). When determining that the reception power is less than the threshold from the conditional expression ("less than reception power threshold" in Step S21), the communication diagnostic unit 242 outputs the "bad diagnosis (reception power is insufficient)" (Step S25).

Figure 13:
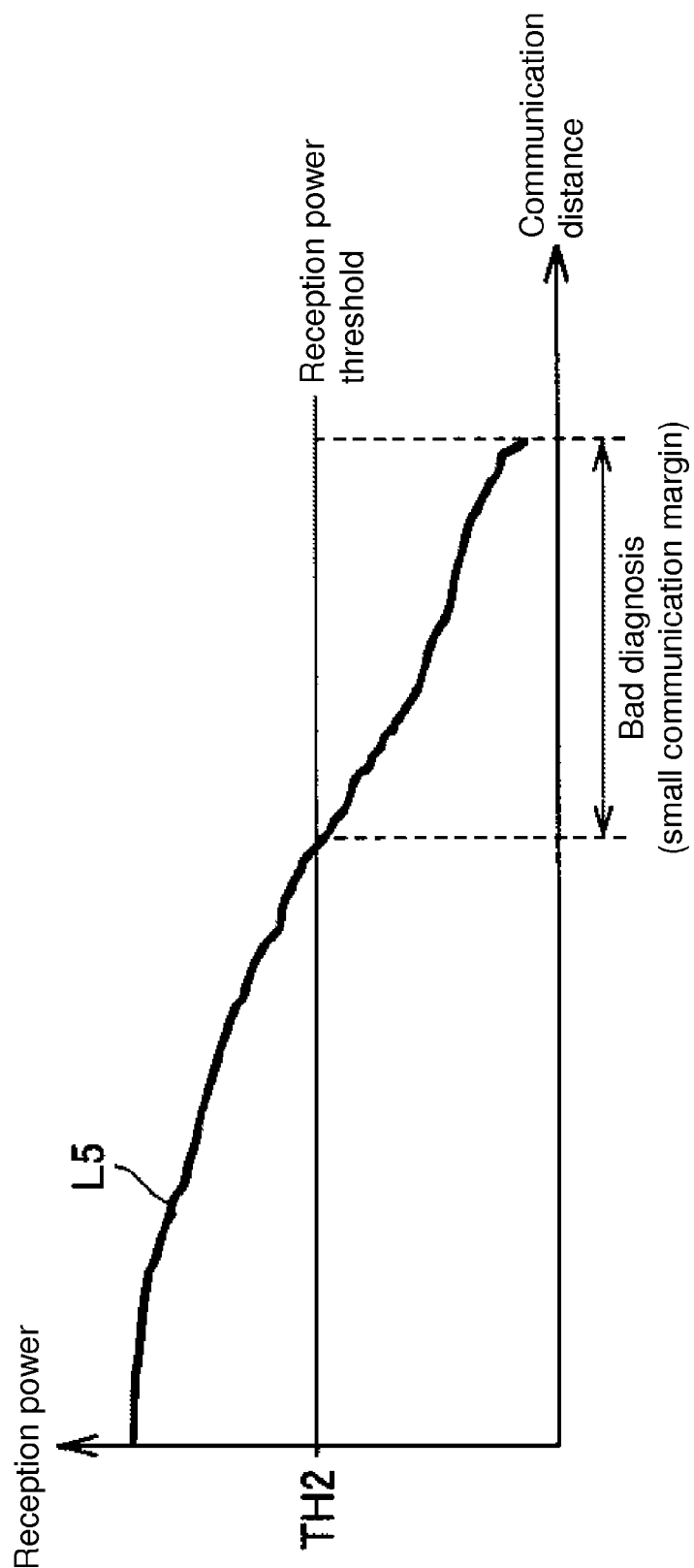
FIG. 13 is a graph illustrating the reception power diagnostic processing of the embodiment.

FIG. 13 is a graph illustrating the reception power diagnostic processing of the embodiment. The vertical axis indicates the reception power of the reception signal from the RF tag 300, and the horizontal axis indicates the communication distance. FIG. 13 illustrates a graph L5 of the reception power acquired from an experiment. In the case that a predetermined threshold TH2 is set in order to determine the reception power, for example, in the case that the reception power is less than the threshold TH2 because the communication distance is lengthened, the determination that the reception power is "less than the reception power threshold TH2" is made in Step S21, the "bad diagnosis (reception power is insufficient)" is output to the controller 240. In the case that the determination that the reception power is "greater than or equal to the reception power threshold TH2" is made in Step S21 because of the short communication distance, "good diagnosis (reception power is normal)" is output to the controller 240.

In the case that the "good diagnosis" is output, it is said that the communication margin is high with respect to the reception power. In the case that the "bad diagnosis (reception power is insufficient)" is output, it is said that the communication margin is low with respect to the reception power although the communication is successful.

The threshold of each piece of diagnostic processing is acquired by the experiment, and previously stored in the storage 270. The setting of the threshold can be changed.

The determination is made by two stages of "normal" and "caution" in the diagnostic processing. Alternatively, the determination may be made by at least three stages by providing plural thresholds.

(Transmission Power Diagnostic Processing)

In the above pieces of diagnostic processing, the communication margin is determined from the characteristic values (the noise quantity, the S/N ratio, and the reception power) acquired from the communication signal, particularly from the reception signal based on the predetermined criteria (the above thresholds). On the other hand, in transmission power diagnostic processing, the criteria indicate whether the response signal is successfully received from the RF tag 300 when transmitted at predetermined transmission power.

Figure 14:
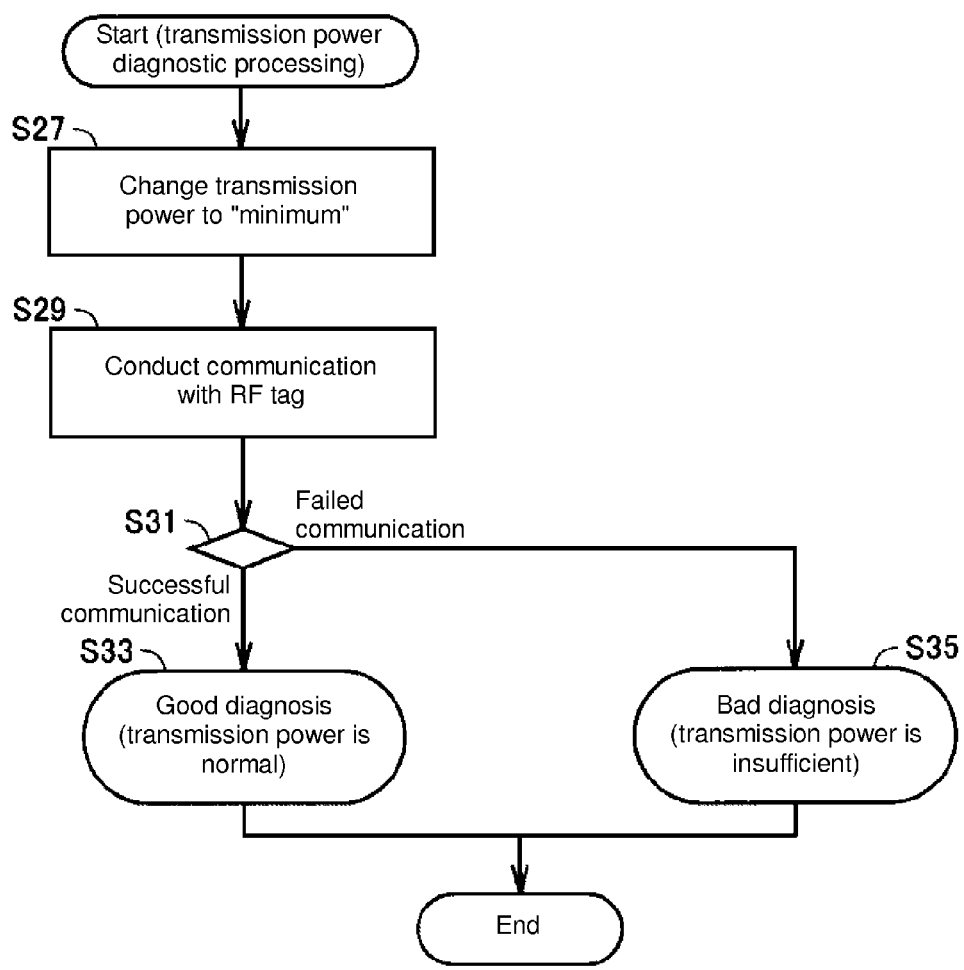
FIG. 14 is a flowchart of transmission power diagnostic processing of the embodiment.

FIG. 14 is a flowchart of the transmission power diagnostic processing of the embodiment. The transmission power is set to the "maximum" during the normal communication (Step S3). When the transmission power diagnostic processing is started, the communication diagnostic unit 242 changes the transmission power to the "minimum" indicating weak transmission power at which it is determined that the RFID reader/writer 200 can stably conduct communication, and transmits the carrier signal (Step S27). Then the data is transmitted to the RF tag 300 to conduct communication (Step S29). When the controller 240 can receive the response signal (including the error signal) from the RF tag 300, the determination of the "successful communication" is made in Step S31, and the "good diagnosis (transmission power is normal)" is output (Step S33). On the other hand, when the response signal cannot be received, the determination of the "failed communication" is made in Step S31, and the "bad diagnosis (transmission power is insufficient)" is output (Step S35).

Figure 15:
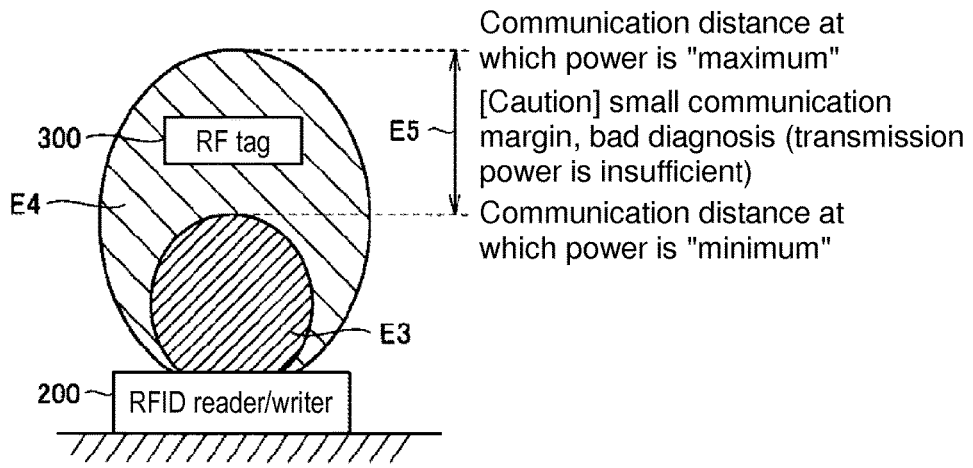
FIG. 15 is a view schematically illustrating a relationship between transmission power and a communication distance of the embodiment.

FIG. 15 schematically illustrates a relationship between the transmission power and the communication distance of the embodiment. FIG. 15 illustrates the case that the RF tag 300 is located in a direction in which the RFID reader/writer 200 (more specifically, the antenna coil 211) emits the radio wave. For the communication at the minimum that is of the weak transmission power, the determination of the successful communication is made in the case that the RF tag 300 is located in a region E3. For the communication at the maximum transmission power, it is determined that the communication is successfully conducted with the RF tag 300 located in a region E4 including the region E3. On the other hand, in the case that the RF tag 300 is located in a region E5 from the minimum that is of the weak transmission power to the maximum power, the determination of the "bad diagnosis (transmission power is insufficient)" is made in the transmission power diagnostic processing.

In the case that the "good diagnosis" is output, it is said that the communication margin is high with respect to the transmission power. In the case that the "bad diagnosis (transmission power is insufficient)" is output, it is said that the communication margin is low with respect to the transmission power although the communication is successful.

(Modification of Transmission Power Diagnostic Processing)

A modification of the transmission power diagnostic processing will be described with reference to FIGS. 16 and 17. In the above transmission power diagnostic processing, the diagnosis is made while the transmission power is divided into the two stages of the minimum and the maximum by adjusting the power supply voltage for the oscillation. In the modification, the diagnosis is made in detail while the transmission power is divided into at least three stages.

Figure 16:
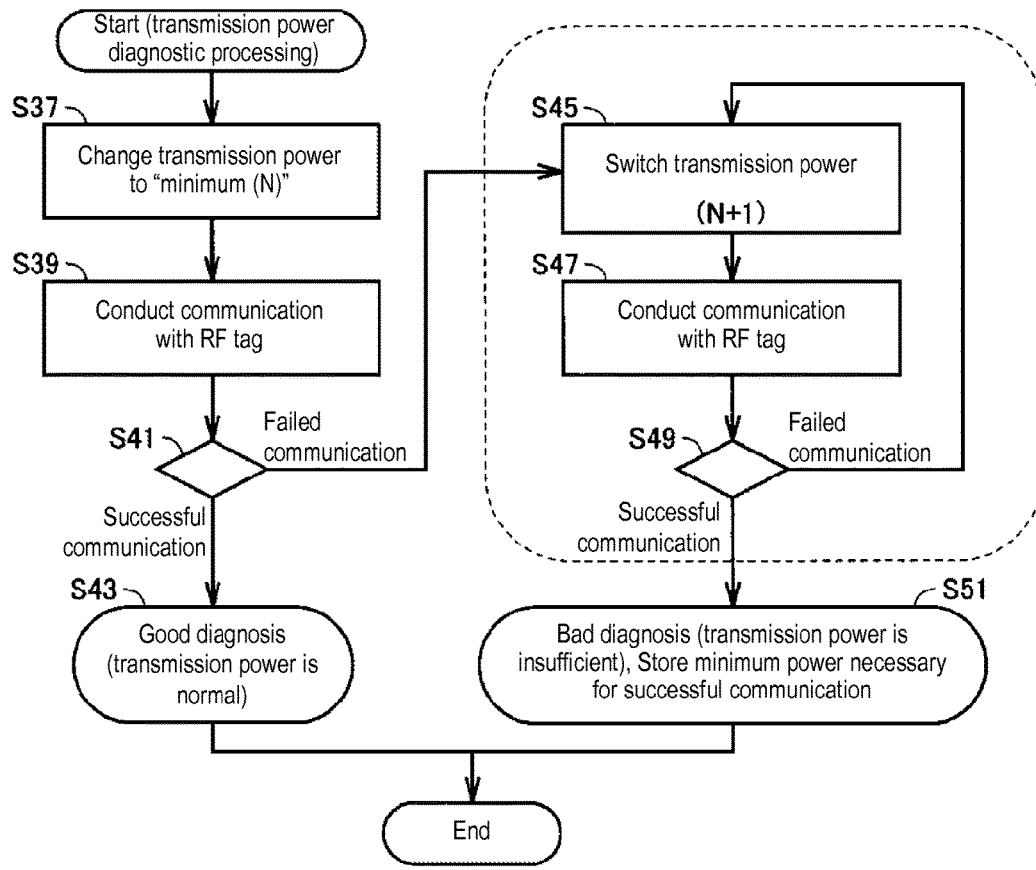
FIG. 16 is another flowchart of transmission power diagnostic processing of the embodiment.

FIG. 16 is another flowchart of the transmission power diagnostic processing of the embodiment.

Figure 17:
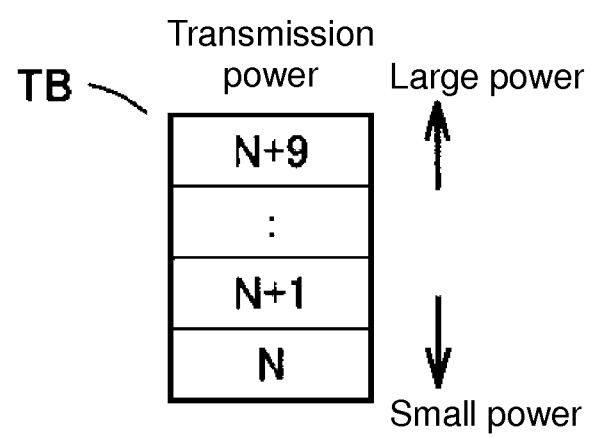
FIG. 17 is a view illustrating a table TB referred to for stepwise switching of the transmission power.

FIG. 17 is a view illustrating the table TB referred to for stepwise switching of the transmission power. The table TB is previously stored in the storage 270, and data in which the transmission power is divided into 10 stages from the minimum (N) to the maximum (N+9) is registered.

Referring to FIG. 16, the communication diagnostic unit 242 searches the table TB to change the transmission power to the "minimum (N)", the oscillation of the carrier signal is started (Step S37), and the communication with the RF tag 300 is conducted (Step S39).

The determination of the successful/failed communication is made based on the response signal from the RF tag 300 (Step S41). When the determination of the failed communication is made ("failed communication" in Step S41), the flow goes to Step S45. When the determination of the successful communication is made ("successful communication" in Step S41), the "good diagnosis (transmission power is normal)" is output (Step S43).

In Step S45, the communication diagnostic unit 242 reads the data "N+1" registered in the next rank of the table TB, and performs the oscillation while switching the transmission power to that indicated by the read value (Step S45). The data communication is conducted with the RF tag 300 based on the switched transmission power (Step S47). The determination of the successful/failed communication is made based on the response signal received during the communication conducted at the switched transmission power (Step S49). When the determination of the failed communication is made ("failed communication" in Step S49), the flow returns to Step S45.

In Step S45, the communication diagnostic unit 242 reads the data "N+2" registered in the next rank of the table TB, and performs the oscillation while switching the transmission power to that indicated by the read value (Step S45). Then the pieces of processing in Steps S47 and S49 are similarly performed. While the determination of the "failed communication" is made, the transmission power is switched to that indicated by the data in the next rank read from the table TB, namely, the transmission power is switched so as to be gradually increased, and the communication is conducted to detect the transmission power at which the determination of the successful communication is made. At this point, for the sake of convenience, it is assumed that the determination of the successful communication is made at one of the values of the table TB.

When the determination of the successful communication is made ("successful communication" in Step S49), the bad diagnosis (transmission power is insufficient)" is output, and the minimum power data necessary for the successful communication (that is, the last minimum power read from the table TB) is stored in the storage 270 (Step S51). Accordingly, the data indicating the minimum transmission power at which the determination of the "successful communication" is made can be detected and stored by performing the pieces of processing in Steps S45, S47, and S49.

The data is registered in the table TB of FIG. 17 while the transmission power is divided into 10 stages. However, the number of stages is not limited to 10. In the modification, the controller 240 sequentially searches the table TB because the number of divided transmission powers is as relatively small as 10 stages. However, a two-block search method may also be employed. For the large number of divided transmission powers, compared with the sequential search method, the minimum transmission power (the value of N) at which the determination of the "successful communication" is made can quickly be searched by adopting the two-block search method.

(Illustration of Output Information)

FIG. 18 is a view illustrating the table MT of the embodiment. A notification item MTA that is of a result of the communication diagnostic processing and a message content MTB corresponding to each notification item are previously registered in the table MT. The message content MTB includes the detailed diagnostic result and guidance information indicating a coping item that increases the communication margin to enable the stable communication operation in the case that the "caution" is output by the diagnosis. The coping item includes the adjustment of the communication distance and the removal of the noise source.

Referring to FIG. 18, the notification item MTA includes the insufficient transmission power (Steps S35 and S51), the insufficient reception power (Step S25), the insufficient S/N ratio (Step S19), and the excessive noise (Step S13). In Steps S13, S19, S25, S35, and S51, the CPU 241 of the controller 240 searches the table MT based on the corresponding diagnostic result, and reads and outputs the message content MTB that is registered while corresponding to the corresponding notification item MTA. The transmission of the output to the higher-level instrument 100, the storage of the output in the storage 270, or the display of the output on the display unit 280 is performed as an output mode. Accordingly, the user can check the message content MTB expressing the communication diagnostic result by the display 102 of the higher-level instrument 100, the display unit 20, or the data read from the storage 270.

In a modification, the table MT is stored in the memory 112 of the higher-level instrument 100, the CPU 110 searches the table MT based on the diagnostic result received from the RFID reader/writer 200, and the message in FIG. 18 may be displayed on the display 102.

(Enabling/Disabling of Communication Diagnostic Function)

Each flowchart of the above diagnostic processing is previously stored in the storage 270 as the program, and the CPU 241 reads and executes the program of the storage 270 to implement the communication diagnostic processing. In the embodiment, enabling/disabling of the execution of the program can be switched. Specifically, the RFID reader/ writer 200 executes the program based on the command received from the higher-level instrument 100 when receiving a permission command (enabling setting), and the RFID reader/writer 200 does not execute the program when receiving a prohibiting command (disabling setting).

When receiving the command to conduct communication with the RF tag 300 from the higher-level instrument 100, the RFID reader/writer 200 in which the "communication diagnostic function" is disabled performs the (general) RFID wireless communication processing to send back the normal/abnormal response based on the response signal to the higher-level instrument 100. The user is notified of the normal/abnormality by the operating display lamp (LED).

Specifically, during the normal, a code (normal code) indicating that the communication processing is normally completed is sent back to the higher-level instrument 100. In the case that the "read command" is received from the higher-level instrument 100, the code is sent back to the higher-level instrument 100 together with the data read from the RF tag 300. A color (such as green) indicating the "normal" is lit in the operating display lamp. During the abnormality, an abnormal content is determined, and an abnormal code (such as the non-existence error of the RF tag 300 and the communication error) is sent back to the higher-level instrument 100.

A color (such as red) indicating the "abnormality" is lit in the operating display lamp.

When receiving the command to conduct communication with the RF tag 300 from the higher-level instrument 100, the RFID reader/writer 200 in which the "communication diagnostic function" is enabled simultaneously performs the "communication diagnostic processing" in addition to the (general) RFID wireless communication processing. The response expressing the normal/caution/abnormality of the result is sent back to the higher-level instrument 100. The user is notified of the normal/caution/abnormality by the operating display lamp (LED) of the display unit 280.

Specifically, during the normal, a code (normal code) indicating that the communication processing is normally completed is sent back to the higher-level instrument 100. In the case that the "read command" is received from the higher-level instrument 100, the code is sent back to the higher-level instrument 100 together with the data read from the RF tag 300. A color (such as green) indicating the "normal" is lit in the operating display lamp.

During the caution, a code (caution code) indicating that the "communication margin" is decreased although the communication processing is normally completed is sent back to the higher-level instrument 100. In the case that the "read command" is received from the higher-level instrument 100, the code is sent back to the higher-level instrument 100 together with the data read from the RF tag 300. A color (such as yellow) indicating the "caution" is lit in the operating display lamp.

During the abnormality, the message content MTB corresponding to an abnormal code (such as the notification item MTA of the table MT, the non-existence error of the RF tag 300, and the communication error) indicating the diagnostic result expressing the abnormal content is sent back to the higher-level instrument 100. A color (such as red) indicating the "abnormality" is lit in the operating display lamp.

(Order of Communication Diagnostic Processing)

According to the flowchart in FIG. 6, the noise diagnosis, the S/N ratio diagnosis, the reception power diagnosis, and the transmission power diagnosis are sequentially made. However, the order is not limited to the flowchart in FIG. 6, but the order may be variable. When the user manipulates the higher-level instrument 100 to send an order setting command to the RFID reader/writer 200, the CPU 241 changes the performance order of each diagnosis based on the received order setting command. All the pieces of diagnostic processing in FIG. 6 are performed, and the performance result (diagnostic result of each piece of diagnostic processing) may be acquired and output. The user can manipulate the higher-level instrument 100 to send the command to perform all the kinds of diagnostic processing to the RFID reader/writer 200, or the user can manipulate the higher-level instrument 100 to send the command to perform at least one kind of selected diagnostic processing to the RFID reader/writer 200. Based on the command received from the higher-level instrument 100, the CPU 241 performs all the kinds of diagnostic processing or at least one kind of selected diagnostic processing.

The disclosed embodiment is not restrictive, but illustrated only by way of example. The scope of the present invention is expressed not the above description but the claims, and all the changes and modifications equivalent to and within the claims are included in the present invention.

The invention claimed is:

1. An RFID reader and writer comprising:
   a processor; and
   a memory having instructions stored thereon, the instructions when executed causing the processor to perform operations including:
   conducting communication with an RF tag; and
   diagnosing the communication when normal communication is successfully conducted, wherein it is determined that the normal communication is successfully conducted through normal communication processing based on a received response signal;
   acquiring at least one characteristic of the communication from a communication signal with the RF tag;
   determining a communication margin from characteristic values including noise quantity, signal-to-noise (S/N) ratio, and reception power, based on predetermined criteria; and
   outputting information on the communication margin,
   wherein the information output comprises a notification based on the at least one characteristic and a coping item of increasing the communication margin, wherein the coping item includes an adjustment of a communication distance and removal of a noise source.

2. The RFID reader and writer according to claim 1, the operations further including comparing the value of the at least one characteristic to a predetermined threshold, and
   outputting the information on the communication margin from a comparison result.

3. The RFID reader and writer according to claim 1, wherein the at least one characteristic comprises the noise quantity generated around the RFID reader and writer, and the operations further include:
   acquiring the noise quantity generated around the RFID reader and writer; and
   acquiring the reception power from a reception signal.

4. The RFID reader and writer according to claim 1, wherein the at least one characteristic comprises the S/N ratio of a reception signal, and the operations further include:
   calculating the S/N ratio from the reception power of the reception signal and the noise quantity.

5. The RFID reader and writer according to claim 1, wherein the at least one characteristic expresses reception of a response signal when a predetermined level of transmission power is indicated,
   the predetermined criterion indicates whether the reception is successfully performed, and the operations further include:
   determining the communication margin based on whether the response signal is successfully received when the predetermined level of transmission power is indicated.

6. The RFID reader and writer according to claim 5, wherein the predetermined level of transmission power indicates weak transmission power at which it is determined that the RFID reader and writer is able to conduct stable communication.

7. The RFID reader and writer according to claim 5, wherein the predetermined level of transmission power indicates a level that corresponds to each segment when a range from weak transmission power to maximum power at which it is determined that the RFID reader and writer is able to conduct stable communication is divided into a plurality of segments.

8. The RFID reader and writer according to claim 1, the operations further including enabling or disabling a diagnostic function of the processor.

9. A non-transitory computer readable storage medium encoded with an executable computer program that performs diagnostic processing of communication with an RF tag and that, when executed by a processor, causes the processor to perform operations comprising:
   acquiring at least one characteristic of the communication from a communication signal with the RF tag when normal communication is successfully conducted, wherein it is determined that the normal communication is successfully conducted through normal communication processing based on a received response signal;
   determining a communication margin from characteristic values including noise quantity, signal-to-noise (S/N) ratio, and reception power, based on predetermined criteria; and
   outputting information on the communication margin, wherein the information output comprises a notification based on the at least one characteristic and a coping item of increasing the communication margin, wherein the coping item includes an adjustment of a communication distance and removal of a noise source.

* * * * *